(12) United States Patent
Swildens et al.

(10) Patent No.: US 7,143,170 B2
(45) Date of Patent: Nov. 28, 2006

(54) AUTOMATIC MIGRATION OF DATA VIA A DISTRIBUTED COMPUTER NETWORK

(75) Inventors: Eric Sven-Johan Swildens, Mountain View, CA (US); Maurice Cinquini, San Jose, CA (US); Amol Chavarkar, San Mateo, CA (US); Anshu Agarwal, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 10/835,974

(22) Filed: Apr. 29, 2004

(65) Prior Publication Data

US 2004/0221019 A1 Nov. 4, 2004

Related U.S. Application Data

(60) Provisional application No. 60/467,104, filed on Apr. 30, 2003.

(51) Int. Cl.
*G06F 13/00* (2006.01)

(52) U.S. Cl. ............... 709/226; 709/219; 709/238; 709/249; 711/136

(58) Field of Classification Search ........... 709/201, 709/203, 217, 219, 220, 223, 226, 227, 229, 709/249
See application file for complete search history.

(56) References Cited

U.S. PATENT DOCUMENTS

| | | | |
|---|---|---|---|
| 5,935,206 A | | 8/1999 | Dixon et al. |
| 6,269,394 B1 | | 7/2001 | Kenner et al. |
| 6,415,323 B1 | * | 7/2002 | McCanne et al. ........... 709/225 |
| 2002/0007418 A1 | * | 1/2002 | Hegde et al. ............... 709/231 |
| 2002/0087797 A1 | * | 7/2002 | Adrangi ..................... 711/133 |
| 2003/0002484 A1 | | 1/2003 | Freedman |
| 2003/0046357 A1 | * | 3/2003 | Doyle et al. ................ 709/214 |
| 2003/0120741 A1 | * | 6/2003 | Wu et al. .................... 709/213 |
| 2003/0135509 A1 | * | 7/2003 | Davis et al. ................ 707/100 |
| 2004/0049579 A1 | * | 3/2004 | Ims et al. ................... 709/225 |
| 2004/0088412 A1 | * | 5/2004 | John et al. .................. 709/226 |

OTHER PUBLICATIONS

PCT/US2004/013519, International Preliminary Report dated Dec. 1, 2005 (6 pgs).
International Searching Authority, "Notification of Transmittal of the International Serach Report and the Written Opinion of the International Searching Authority, or the Declaration," PCT/US04/13519, dated Oct. 28, 2005, 12 pages.

(Continued)

*Primary Examiner*—Viet D. Vu
(74) *Attorney, Agent, or Firm*—Kirk D. Wong; Hickman Palermo Truong & Becker LLP

(57) ABSTRACT

A method and apparatus for the automatic migration of data via a distributed computer network allows a customer to select content files that are to be transferred to a group of edge servers. Origin sites store all of a customer's available content files. An edge server maintains a dynamic number of popular files in its memory for the customer. The files are ranked from most popular to least popular and when a file has been requested from an edge server a sufficient number of times to become more popular than the lowest popular stored file, the file is obtained from an origin site. The edge servers are grouped into two service levels: regional and global. The customer is charged a higher fee to store its popular files on the global edge servers compared to a regional set of edge servers because of greater coverage.

24 Claims, 10 Drawing Sheets

OTHER PUBLICATIONS

Current Claims, PCT/US04/13519, 6 pages.

A. Barbir, et al., "Known Content Network (CN) Request-Routing Mechanisms," Jul. 2003, http://www.ietf.org/internet-drafts/draft-ietf-cdi-known-request-routing-03.txt, data retrieved May 24, 2004, pp. 1-2.

Nalini Venkatasubramanian, et al., "Effective Load Management for Scalable Video Servers," Sep. 12, 1996, pp. 1-35.

Jussi Kangasharju, et al., "Distributing Layered Encoded Video Through Caches," 14 pages.

Zhi-Li Zhang, et al., "Video Staging: A Proxy-Server-Based Approach to End-to-End Video Delivery over Wide-Area Networks," 14 pages.

David Karger, et al., "Consistent Hashing and Random Trees: Distributed Caching Protocols for Relieving Hot Spots on the World Wide Web," 10 pages.

Duc A. Tran, et al., "A New Caching Architecture for Efficient Video-on-Demand Services on the Internet," 10 pages.

Duc A. Tran, et al., "A New Caching Architecture for Efficient Video Services on the Internet," 6 pages.

Wallapak Tavanapong, et al., "Video Caching Network for On-Demand Video Streaming," 5 pages.

Wei-Ying Ma, et al., "Content Services Network: The Architecture and Protocols," 9 pages.

Sung-Ju Lee, et al., "An Interactive Video Delivery and Caching System Using Video Summarization," 9 pages.

David Karger, et al., "Web Caching with Consistent Hashing," http://www8.org/w8-papers/2a-webserver/caching/paper2.html, data retrieved May 25, 2004, pp. 1-15.

Markus Hofmann, et al., "Caching Techniques for Streaming Multimedia over the Internet," pp. 1-11.

P. Mockapetris, "Domain Names—Implementation and Specification," Nov. 1987, http://www.ietf.org/rfc/rfc1035.txt?number=1035, data retrieved May 25, 2004, pp. 1-52.

R. Fielding, et al., "Hypertext Transfer Protocol -HTTP/1.1," Jun. 1999, http://www.ietf.org/rfc/rfc2616.txt?number=2616, data retrieved May 25, 2004, pp. 1-165.

H. Schulzrinne, et al., "Real Time Streaming Protocol (RTSP)," Apr. 1998, http://ietf.org/rfc/rfc2326.txt?number=2326, data retrieved May 25, 2004, pp. 1-86.

* cited by examiner

Content upload and distribution to origins

Delivery of unpopular content

Delivery of newly uploaded content which has not finished replicating

Choosing replication source for popular content

AUTOMATIC MIGRATION OF DATA VIA A DISTRIBUTED COMPUTER NETWORK

CROSS-REFERENCES TO RELATED APPLICATIONS

This claims priority to Provisional U.S. Patent Application No. 60/467,104, filed Apr. 30, 2003, titled "System and Method for Distribution and Delivery Large Data Collections from a Distributed Computer Network", the entire contents of which are incorporated herein by this reference.

BACKGROUND

The Internet has enabled information providers to provide multimedia information to users across the world. The amount of available information has increased exponentially in the small time that the Internet has been accessible to the public.

As more and more users access information providers' large multimedia files, such as music and movies, the information providers' servers became overloaded. The bottleneck became the bandwidth that the servers could handle.

Replica (including caching) servers were introduced that were spread across the Internet. The caching servers contained mirror images of the information providers' multimedia files. This eased the burden on the information providers' servers by offloading the user requests to the caching servers. Replicating the information providers' multimedia files across the caching servers required a large amount of storage for infrequently accessed files and Internet bandwidth.

Additionally, the number of files that are actually accessed within an information provider's collection of multimedia files is low in comparison to the total number of files in the collection.

Based on the foregoing, there is a clear need for a system that provides for the intelligent distribution of an information provider's multimedia files across the Internet. Additionally, there is a need for a system that allows servers across the Internet to dynamically adapt to varying demands for multimedia files.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
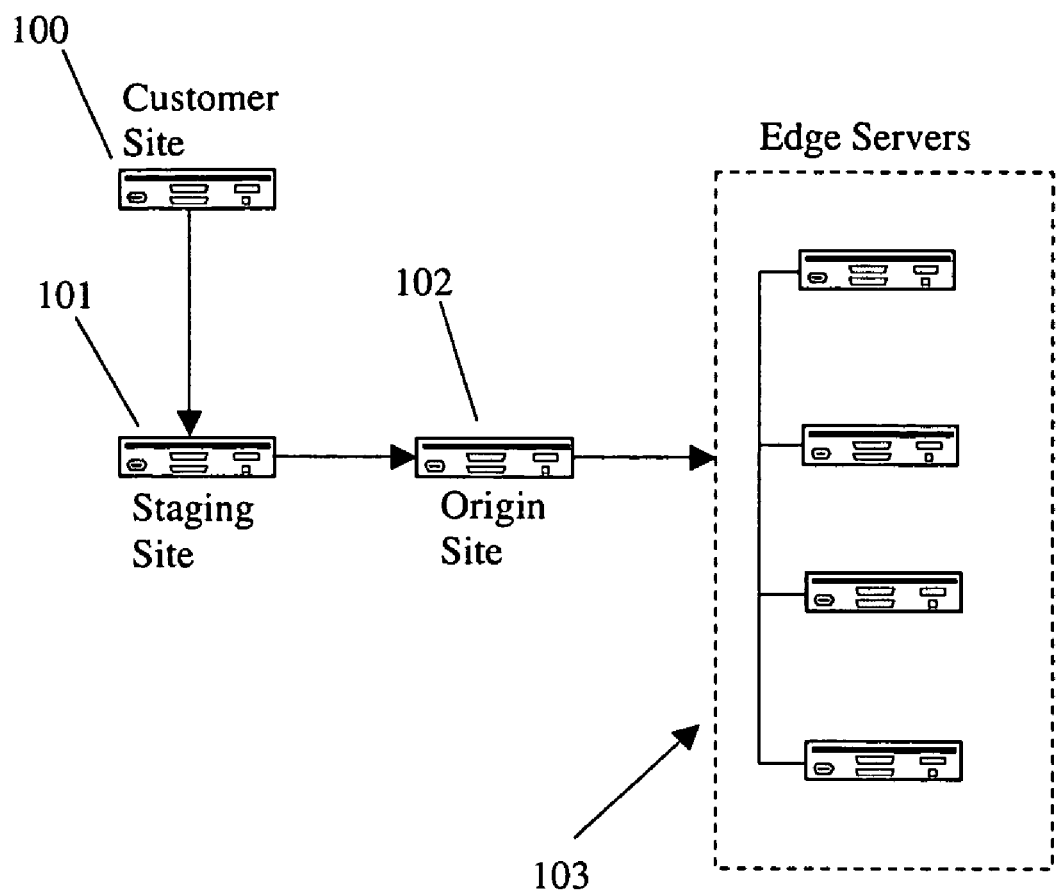
FIG. 1 illustrates a block diagram of customer site uploading content into a group of edge servers according to an embodiment of the invention.

A method and apparatus for the automatic migration of data via a distributed computer network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
- 1.0 General Definitions
- 2.0 General Overview
- 3.0 Structural and Functional Description
  - 3.1 Server Structure
    - 3.1.1 Uploading Content to Servers
    - 3.1.2 Predicting the Popularity of Files
  - 3.2 Server Operation
  - 3.3 Replicating and De-Replicating Files
- 4.0 Extensions and Alternatives 1.0 General Definitions Common definitions used in the text:

| | |
|---|---|
| end-user | As well as the actual person this refers to the computer systems acting on behalf of the user. |
| host name | A DNS host name. |
| customer | The provider of a subset of an entire content collection that requires independent accounting of storage or delivery used. |
| local | A geographically limited region that allows better network communication. Typically to a one km radius, controlled by a central authority and not across the general Internet, e.g., a private network in a building. |
| remote | Not local, but communications are still available, e.g., across the general Internet. |

-continued

| | |
|---|---|
| local storage device | Storage connected to a server via a high performance, dedicated communications channel, e.g., local disk peripheral communication methods such as: ATA, SCSI, FiberChannel, or even SANs that are higher performing than another servers remotely mounting the same disk as NAS (e.g., via NFS or CIFS). An NAS can also be considered as dedicated storage for one or more servers when compared to other servers on the same LAN that have restricted access to this NAS. |
| LAN | Local Area Network. Connects local hosts. |
| WAN | Wide Area Network. Connects remote hosts. |
| NAS | Network Attached Storage |
| SAN | Storage Attached Network |
| SCSI | Small Computer System Interconnect. A communication bus for connecting peripheral storage. |
| NFS | Network File System |

Digital content has the following properties:

The content is naturally stored in separate objects (e.g., files) that are usually requested, but not necessarily played, in entirety.

The content objects are naturally grouped into collections (e.g., DNS domains) that use an object identifier (e.g., a path) specified by a source outside of the system (e.g., the customer.)

A single content collection is too big to cost effectively store and deliver from single servers, but the most popular objects requested from a region could fit on a single server and those requests would comprise a significant share of the delivery load.

The popularity of various content objects usually varies slowly compared to the rate at which the popularity can be measured and the content objects can be replicated.

The communications network has the following properties:

The communications network has different levels of performance and cost between servers and end users.

The end users can be automatically redirected to another location to repeat the request using a different content identifier.

The cost and time to deliver an object is large in comparison to the cost and time to redirect and connect end users to an alternate location for the content.

2.0 General Overview

The needs identified in the foregoing Background, and other needs and objects that will become apparent for the following description, are achieved in the present invention, which comprises, in one aspect, a method and apparatus for the automatic migration of data via a distributed computer network.

An embodiment allows a customer to select content files that are to be transferred to a group of edge servers. The customer's server schedules the files to be transferred to a staging site. The staging server pulls or pushes the files from the customer server and stages the file to be uploaded to the appropriate origin sites that store the files locally. Origin sites are ideally the minimum set of servers in the system scheduled to store all of a customer's available content files. The customer is charged for the amount of memory used in the origin sites to store the customer's files.

An edge server maintains a dynamic number of popular files in its memory for the customer. The number of files is determined by the fixed amount of memory that the edge server reserves for the customer. The amount of space is determined by the customer demands and is fee based. The files are ranked from most popular to least popular (among the stored files). The edge server records each time a file is requested. It periodically reviews the requests and, when a file has been requested from an edge server a sufficient number of times to become more popular than the lowest popular stored file, the file is obtained from an origin site. The customer is charged for the bandwidth used to transfer files from the origin servers to the edge servers.

The edge servers can be grouped into multiple service levels: regional and global. Regional edge servers serve a specific geographic region, e.g., Europe, Asia, and America. There may be several regions and therefore several sets of edge servers. Global edge servers are the group of edge servers at the edge of the global network. The customer is charged a higher fee to store its popular files on the global edge servers compared to a regional set of edge servers because of greater coverage and higher maintenance costs.

The edge servers can also be grouped using other dynamic factors that allow the creation of variable groupings. The groups can be selected using factors such as lower cost (cheaper current bandwidth cost, e.g., bandwidth is determined to be cheaper if the bandwidth for the server is below the commit level), higher performance (customer pays for a group of servers with higher speed and availability) or time-based (evaluating when lower peak times occur and selecting a group of servers that have a lower load during a specific time period).

An edge server receives a user's request for content. If the edge server has the requested content stored on its local storage, it sends the file to the user. If the content is not in the edge server's stored popular files, then the edge server redirects the user to an origin server that should have the content stored locally.

The origin server checks for the requested content on its local storage and returns the corresponding file to the user if found. Otherwise, the content has not been uploaded into the origin servers and still resides on the staging server's local storage. The origin server then will redirect the user to the staging server where the content is served to the user.

3.0 Structural and Functional Description 3.1 Server Structure

An embodiment provides a distributed system of Internet servers whose IP addresses are resolved by an intelligent DNS server. Edge servers are servers that are able to respond to an end-user request for a published URL and can also store popular content. Origin severs together store the complete copies of all of the content for a particular customer.

The intelligent DNS server(s) and all other servers are able to compute a hash (this can also be a directory address) from a content file identifier to determine which origin server should store the file on its local storage device.

Customers can insert copies of the content into the system at an upload (or staging) server selected by the intelligent DNS system. The staging server saves the content to the local storage device of an origin server determined by the hash of the content identifier. The staging server may also be an origin server.

FIG. 1 illustrates an embodiment that implements a server structure that distributes an information provider's (customer) multimedia files across the Internet or network to a group of edge servers 103. Edge servers 103 are known to be servers distributed at the edge of a network area. For the Internet, edge servers 103 are placed in a specific geographical region. The edge servers 103 serve content to user requests within the region.

A customer selects multimedia files that are to be transferred to the edge servers. The customer's site 100 schedules the files to be transferred to a staging site 101. The staging site 101 pulls the files from the customer site 100 and stages the file to be uploaded to an origin site 102 that stores the files locally.

The edge servers 103 operate using a file popularity profile. An edge server maintains a dynamic number of popular files in its local memory for the customer. The files are ranked from most popular to least popular (among the stored files). When a file has been requested from an edge server a sufficient number of times to become more popular than the lowest popular stored file, then the file is obtained from the origin site 102.

The customer is charged for the amount of storage required on the origin site 102 to store the customer's files. The customer purchases a fixed amount of storage on the edge servers that is used to store a limited number of files. The customer is also charged for the bandwidth used to load the files onto the origin site 102 and edge servers 103. This allows the customer to adjust the amount of storage anticipated for file demand.

A system comprising multiple more tightly coupled computers (e.g., sharing a single NAS or SCSI disks) can also be thought of as single server for this discussion.

Servers should typically have at least the combined storage and delivery capacity to store one copy of all of the content files and satisfy the peak delivery load. More LAN-connected groups of origin servers can be added to increase the minimum amount of redundancy required and to improve the performance of unpopular or rapidly popular content. More edge servers can be added to increase the performance of popular content.

Note that one physical server may perform both origin and edge functions. The trade-off is that the amount of local storage capacity used for the origin object file copies reduces the available storage capacity for replicating popular objects. Reducing an edge server's capacity for storing popular objects makes it less efficient and more susceptible to thrashing.

An individual origin server does not have to be able hold all of the content on its local storage device—even for all of the content for one host name in published URLs. Redirected requests to origin servers have a hash included in the URL (e.g., in the host name or first component of the path) that the origin server is able to use to determine which other of the LAN-connected origin servers in its group should hold the content on its local storage device.

The hash function can be any method that maps the large number of content identifiers across the much smaller number of storage servers required to store all the content for a customer. A good hash function is one that spreads the content storage requirements of the content identifiers across the actual storage capacities of each of origin server group. Note that:

In general, content identifiers do not contain information on the storage requirements for the object file.

Servers may have differing amounts of local storage capacities.

The hash function need not be so concerned with spreading the total delivery load since only requests for unpopular objects are distributed with the hash function.

The hash function could be an algorithmic mapping of content identifiers to a server name (e.g., consistent hashing). A manually configured mapping of groups of content objects to servers (e.g., a table that maps customers or top-level directories to servers or a full directory map) will also work well when the rate of change of storage in the content groups is slow compared to the time it takes to manually reconfigure the groups.

A simple URL partitioning scheme is one that uses a configured table of information to map the host name in a URL to one of the servers in the group. Another method could be to use a hash of the published URL.

Figure 2:
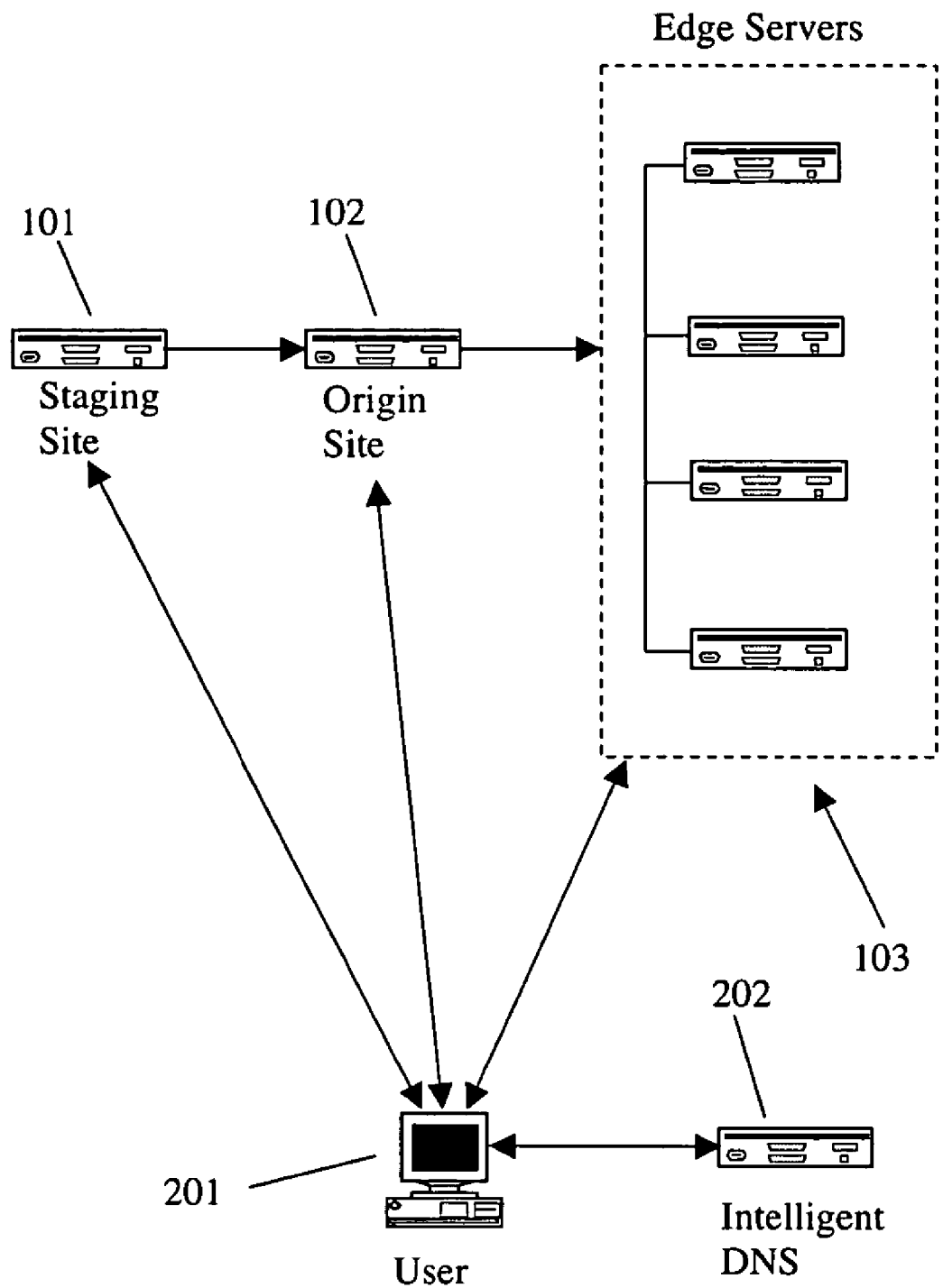
FIG. 2 illustrates a block diagram of a user accessing popular content from a group of edge servers according to an embodiment of the invention.

FIG. 2 illustrates an embodiment of the invention where the user 201 requests a customer's file. The user is directed to an edge server by DNS 202 that is appropriate to serve the requested file. This can be based on edge server load, geographic location in relation to the user, response time, etc.

The user's request is directed to an edge server 103, possibly via an intelligent DNS server 202 such as that described in U.S. patent application Ser. No. 09/638,170, titled "Scalable Domain Name System with Persistence and Load Balancing", owned by the Applicant and whose contents are incorporated herein by reference. If the edge server has the requested file, it then forwards or streams the file to the user 201 and records a hit for the file. If the edge server does not have the file, it records the miss in its running count and redirects the user 201 to the origin site 102. The edge server checks the frequency of requests over a certain amount of time (configurable by an administrator) to see if any new files have gained enough popularity to replace another file in the local storage. If so, it then requests the file from the origin site 102.

If the user is redirected to the origin site 102, the origin site 102 checks its local storage for the requested file. If the origin site 102 has the file, it sends or streams the file to the user 201. If the origin site 102 does not have the file, then it redirects the user to the staging site 101 because the file has not yet been transferred to the origin site 102.

The user 201 will finally obtain the file from the staging site 101. This process is described in more detail below.

Figure 10:
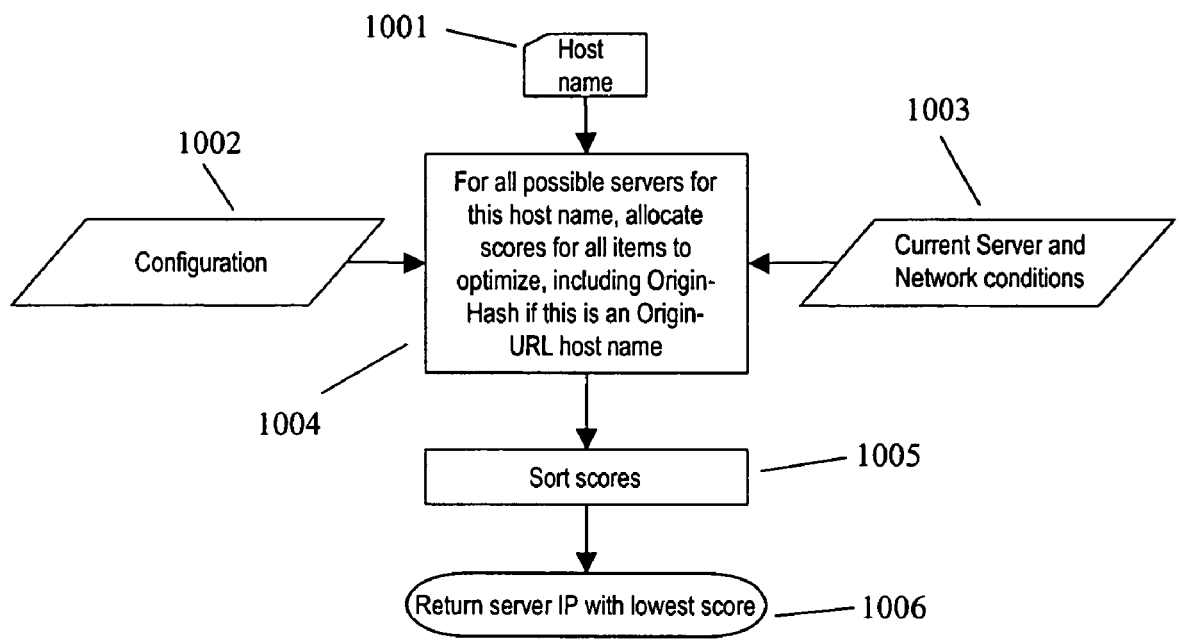
FIG. 10 illustrates a flow chart showing intelligent DNS server operation according to an embodiment of the invention.

Referring to FIG. 10, the intelligent DNS server selects the actual staging, edge, and origin server IP address(es) 1004 by choosing the "best" server(s) from a configured set of servers that match the host name 1001 based on a balance of provider costs 1002 (e.g., bandwidth costs) and end-user satisfaction 1003 (e.g., network latency and packet loss between the server and the client). An additional modification is to add to the costs, a factor to use in weighting server selection for origin and upload host names that favors the use of servers that should be able to access the file on their local storage device rather than across the network. The intelligent DNS server knows which origin server in a group of LAN-connected origin servers should have the requested object from the hash in the origin host name and configuration information 1002. The DNS server does not require the actual content identifier.

The scores of the candidate servers are sorted 1005 and the server's Internet address with the lowest score is used for redirection 1006.

The server Internet address(es) returned for a host name from a published URL is selected from a configured set of edge servers that can hold popular content and, optionally, a mix of origin servers, if desired.

The server Internet address(es) returned for a host name from an origin URL is selected from a configured set of origin servers, but with an additional preference for the origin servers that should be holding the content on their local storage device.

The redirection used is something common Internet clients understand without the need for customization to support the system, e.g., via a protocol supported redirection method (e.g., HTTP 302 redirects) or application specific (e.g., ASX file entries with secondary URLs to try in case the first one fails).

Figure 3:
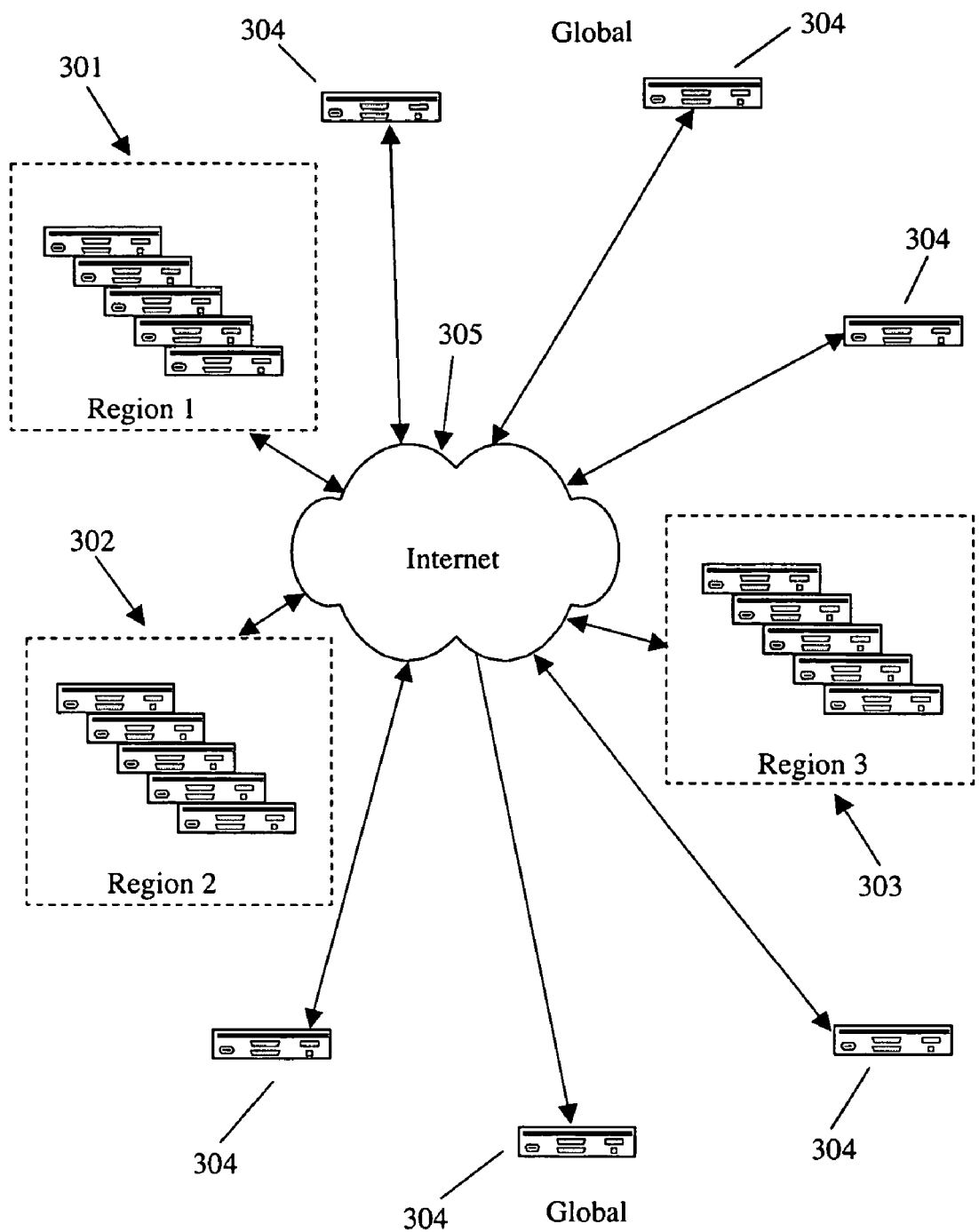
FIG. 3 illustrates a block diagram of an embodiment providing regional and global edge servers providing popular content according to an embodiment of the invention.

FIG. 3 illustrates an embodiment of the invention that provides two levels of edge servers. Regional edge servers 301, 302, 303, provide edge servers on a regional basis, e.g., United states, Europe, Asia, etc. These regional edge servers 301, 302, 303, are placed on the edges of the regional networks for improved accessibility to the interior Internet network 305. Global edge servers 304 are edge servers that are on the edge of the worldwide Internet 305.

Customers are given the option to purchase memory space on specific regional edge servers 301, 302, 303, and/or on global edge servers 304. The global edge server memory allocations typically garner a higher rate than memory on the regional edge servers because of the greater geographic coverage and higher operational costs.

The edge servers can also be grouped using other dynamic factors that allow the creation of variable groupings. The groups can be selected using factors such as lower cost (cheaper current bandwidth cost, e.g., bandwidth is determined to be cheaper if the bandwidth for the server is below the commit level), higher performance (customer pays for a group of servers with higher speed and availability) or time-based (evaluating when lower peak times occur and selecting a group of servers that have a lower load during a specific time period).

Configuration information is distributed to the servers, for example:

Valid customer list and passwords.

Mapping of convenient group names for sets of servers.

Minimum group of servers designated to hold all of the content collection that includes the file.

Internet addresses of the servers.

Which servers share common storage.

Address of the original content.

Each time a change is made to the configuration, a relatively small file containing this configuration is distributed to each server.

3.1.1 Uploading Content to Servers

An embodiment can be configured to store more than one copy of all the content object files. The files are replicated to groups of origin servers, where each server in a group can access each other's local storage devices via a LAN, and each group of LAN-connected servers are typically separated across the WAN.

Each LAN-connected group may have a different number of servers, so long as the system is configured to compute a hash that divides the total content across these servers such that no individual storage device's capacity is exceeded. A replication process is started when content is uploaded to replicate new files to the other origin servers' local storage devices that the hash indicates should hold the new object.

The content is uploaded along with details of the desired content identifier (e.g., published URL host name and path) to an upload host name that the intelligent DNS resolves to a server. In an embodiment, the upload hostname includes the published URL hostname. The upload host name includes information that the intelligent DNS can use to determine which configured LAN-connected origin group to store all of the content for the published URL host name. The upload server can also be an origin server.

Internally, the staging server stores the content to the origin server (usually across the LAN) and is directed to the origin server by the configured hash function. The staging server does not have to store content and simply forwards the content to the origin server. If other LAN-connected origin groups are configured for this content collection, then the content is replicated across the WAN to the other origin servers.

When a file is uploaded to the system, the following is performed:

1) Upload via the intelligent DNS domain to a current best server out of the servers configured to allow upload for this domain. The server can also be an origin server, thereby removing the need for one more transfers of the data at the expense of having both upload and delivery traffic on the same server.

2) The file is replicated across the WAN once for each group of servers that is configured to be a possible origin for this domain. The actual server selected is one that matches the hash function.

The number of groups of origin servers and thus, the number of complete copies of the content, can be configured to be the lowest number to accommodate the:

a) Minimum number of redundant storage locations.

Even if redundancy of storage is used within a server (e.g., RAID5), having geographically separated backups is useful.

b) Unpopular content only:

Minimum number of delivery locations for capacity.

Minimum number of redundant delivery locations for reliability.

The required spread of delivery locations for performance.

The origin server can have the performance characteristics to deliver relatively unpopular content or content that has just become popular, but not yet replicated by the invention.

As part of the upload process, the content provider identifies the published URL's scheme (protocol), host name and path, e.g., FTP upload is to a top-level directory that matches the published URL host name and the rest of the path matches that required in the published URL. Host names can have a fixed, configured association to one of more protocols, e.g., wm.customer1.cdn.net is for RTSP, and MMS delivery, download.customer1.cdn.net is for FTP or HTTP delivery.

The system allows customers to choose an arbitrary URL for each content file with the following possible exceptions:

The host name must ultimately be resolved by the intelligent DNS system.

A fixed part must be added to the URL path/query to identify the host name again if:

The protocol does not include the published host name in all valid requests (e.g., HTTP/0.9); or The division of content that separate usage accounting requires is not calculable from the published host name.

If it is desired to reduce the number of domain names used for origins, then customers can be made to share these domain names, if:

Another way to identify customers is put into the URL, e.g., top directory path component.

There is no need to access a set of cookies set in the customers' domain.

In an embodiment, customer servers can be used as origin sites with no local storage device affinity. The content either needs to be inserted and deleted from the system or reside in a server outside the system that is accessible by both the system and end-users.

When a content collection is only completely available in a computer system outside the system, that computer system must be able satisfy requests for any of the content from the system or end-users, but without the capacity required to support all the popular end-user requests. While not delivering the full benefits of the system, this mode can be used for some subset of the content to:

Reduce the storage requirements within the system,
Decrease the delivery requirements on the origin,
Give higher delivery performance to popular files.
Migrate end-users over to using the system without the need to have all of the content uploaded to the system.

In the mode where all of the content for a domain name is uploaded to the system there are:

No end-user delivery or storage requirements outside of the system.

Fewer total resources are required to achieve the same performance for the usage patterns targeted by this system.

Figure 4:
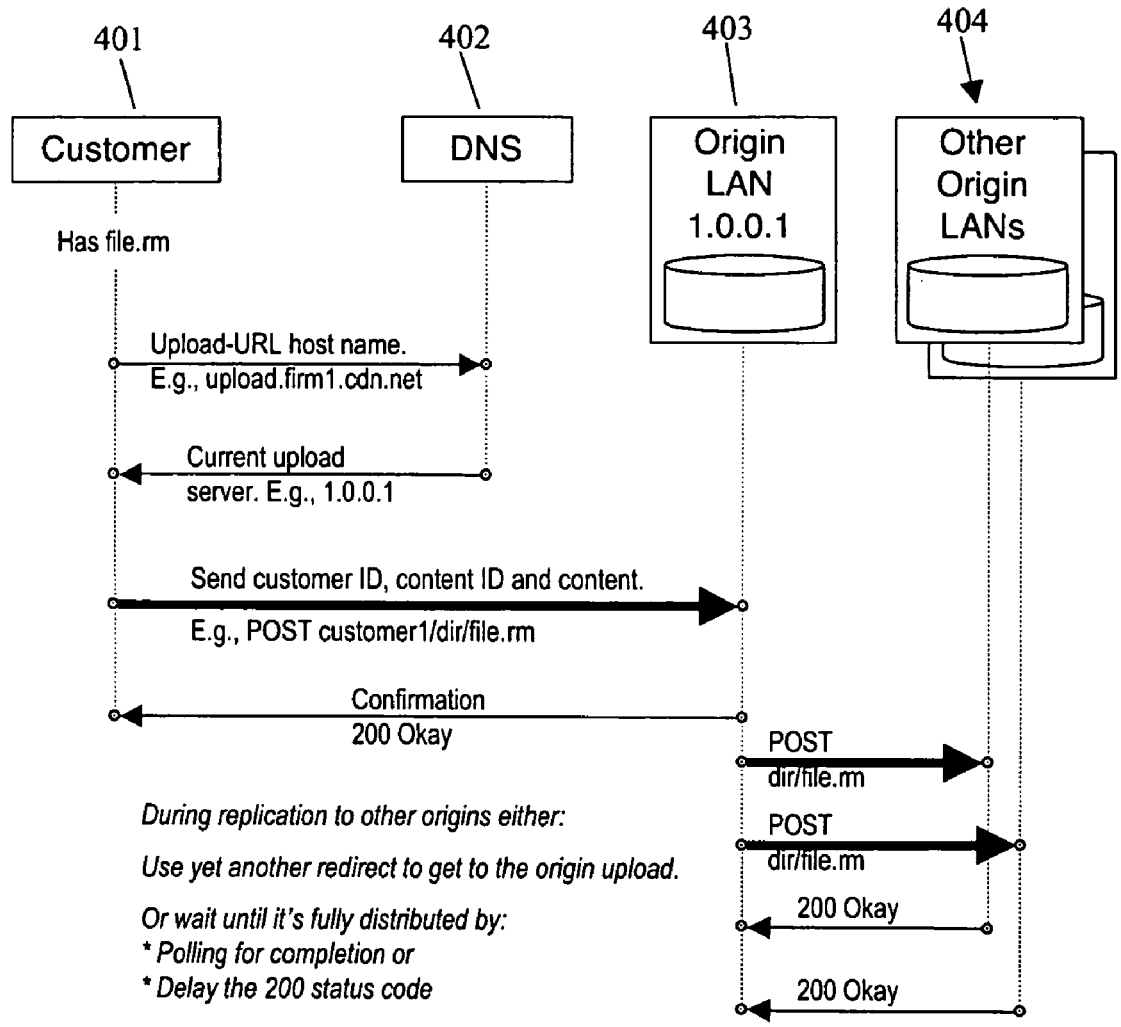
FIG. 4 illustrates a sequence diagram of an embodiment uploading and distributing content to origin sites according to an embodiment of the invention.

FIG. 4 illustrates an embodiment where a customer 401 uploads content to an origin server that also acts as the staging server. The customer 401 is directed to an appropriate origin LAN 403 to which the upload is directed. The intelligent DNS server 402 redirects the customer 401 to the origin site 403.

The customer 401 uploads its files to the origin site 403 and also information identifying the customer and information regarding the files. Once the upload has been completed, the origin site 403 distributes the customer files and information to other origin sites 404 that are LAN-connected and are designated to store the content.

3.1.2 Predicting the Popularity of Files

Each edge server is configured to have storage memory set aside for popular files and maintains a history of recent requests. Optionally, the time of each request and amount of delivery (in bytes) is stored along with the content identification. The popularity of the content in the system is based on how many requests an edge server gets for that content within a specified period of time.

Each edge server location keeps track of the number of requests it receives for all of the content. All of the edge servers log the incoming requests to a log file. Each log line contains the full path name for the content being requested, time at which the request was made and an indication as to whether it was a hit (the content was available locally) or a miss (the content was not available locally).

In an embodiment, at some specified time interval (e.g., every hour) an auto migration server collects all of the log files or log summaries from the edge servers that share storage (such as NAS) and tabulates the miss count (number of times a piece of content was requested locally, but was not available) for every piece of content. It then filters out content for which the miss count falls below a certain miss count threshold value (e.g., ten misses in one hour). For all the content that falls above this threshold value, the daemon sorts them based on the miss count and then selects the top few (say 20) for auto migration.

A centralized server can periodically collect logs from all of the edge serves. The central server can evaluate the log files and create reports to the customer that tell the customer the relative popularity of their files overall and within regional areas as well as other performance statistics for the file delivery and servers. The customer can pay a fee for the amount of detail desired in the reports.

Single edge serves can perform their own periodic evaluation of popular files.

Note that the popularity of the content is determined at the edge of the network. That means that the popular content can vary from one edge location to another. For example, the top ten songs in the Atlanta area will be different from the top ten songs in London.

A single auto migration daemon can combine data from multiple edge servers located in a single edge location to determine the most popular content. That way, if multiple servers are sharing common storage (NAS) then the popularity is based on the aggregate data from all of the edge servers that are accessing that common storage.

The Interval at which the log files are processed, the miss count threshold, and the number of files to migrate can be configured. For example, at an edge location, if nine files are requested with the following miss count distribution (sorted by miss count):

| Name | MissCount |
|------|-----------|
| f1   | 234       |
| f2   | 157       |
| f3   | 50        |
| f4   | 35        |
| f5   | 20        |
| f6   | 15        |
| f7   | 4         |
| f8   | 3         |
| f9   | 1         |

If the miss threshold is set to ten then the three files with the miss count of less than ten are discarded and six files remain:

| Name | MissCount |
|------|-----------|
| f1   | 234       |
| f2   | 157       |
| f3   | 50        |
| f4   | 35        |
| f5   | 20        |
| f6   | 15        |

If the number of files to migrate limit is set to five or storage space limit allows these five files to be stored, then the top five files can only be migrated and the sixth file is discarded. Therefore, the final list of the most popular content that will be auto migrated to this edge location is:

| Name | MissCount |
|------|-----------|
| f1   | 234       |
| f2   | 157       |

-continued

| Name | MissCount |
|---|---|
| f3 | 50 |
| f4 | 35 |
| f5 | 20 |

3.2 Server Operation

Figure 5:
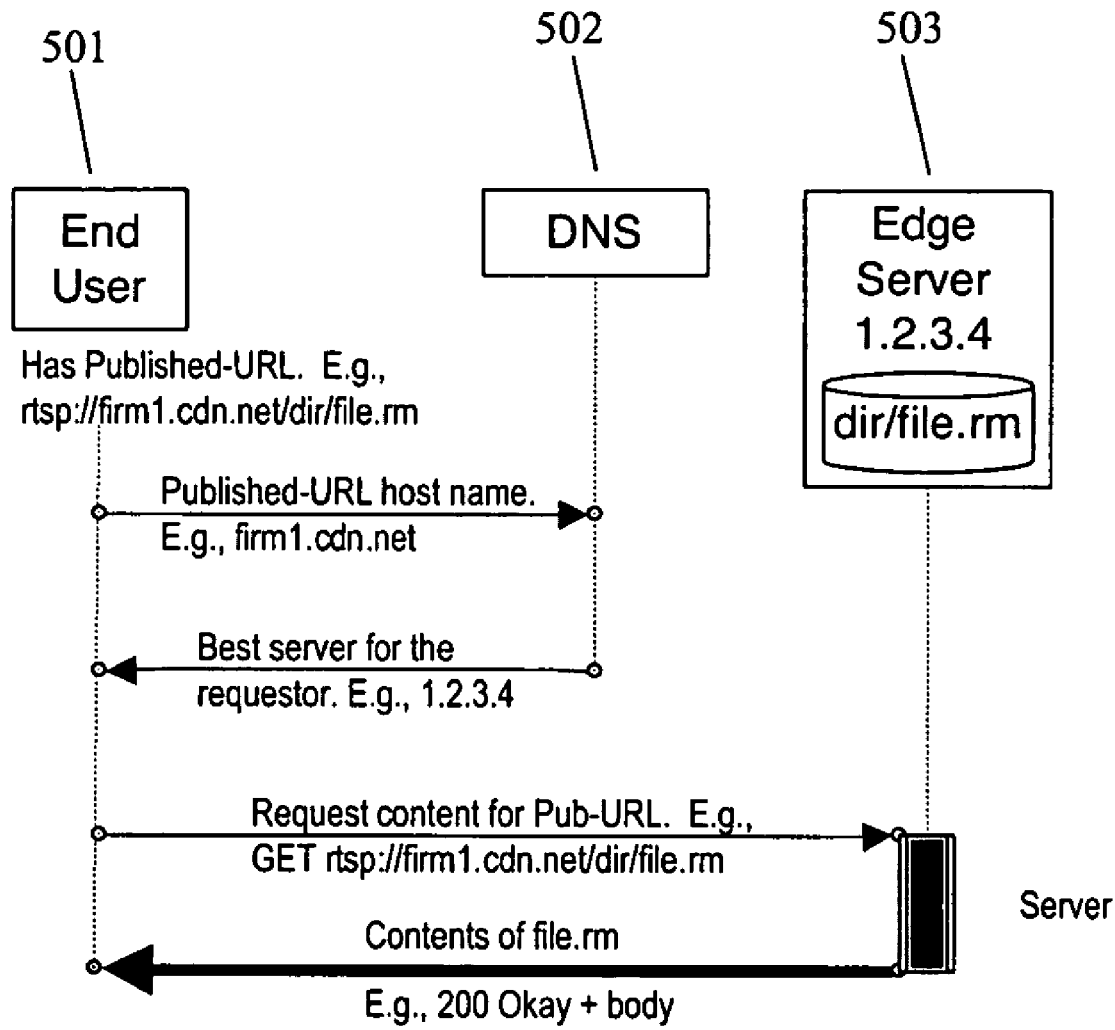
FIG. 5 illustrates a sequence diagram of edge servers delivering popular content to a user according to an embodiment of the invention.
Figure 6:
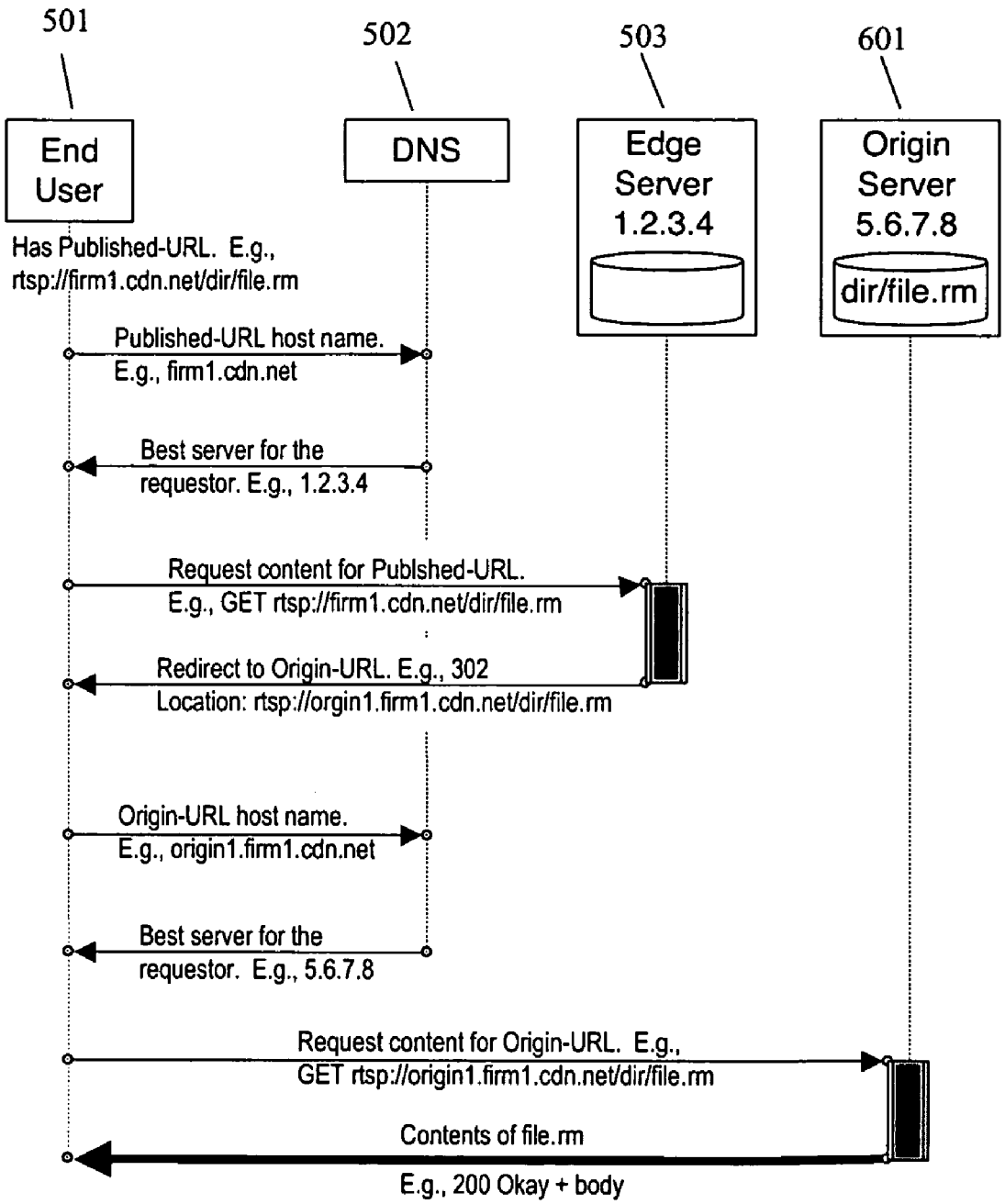
FIG. 6 illustrates a sequence diagram of origin servers delivering unpopular content to a user according to an embodiment of the invention.
Figure 7:
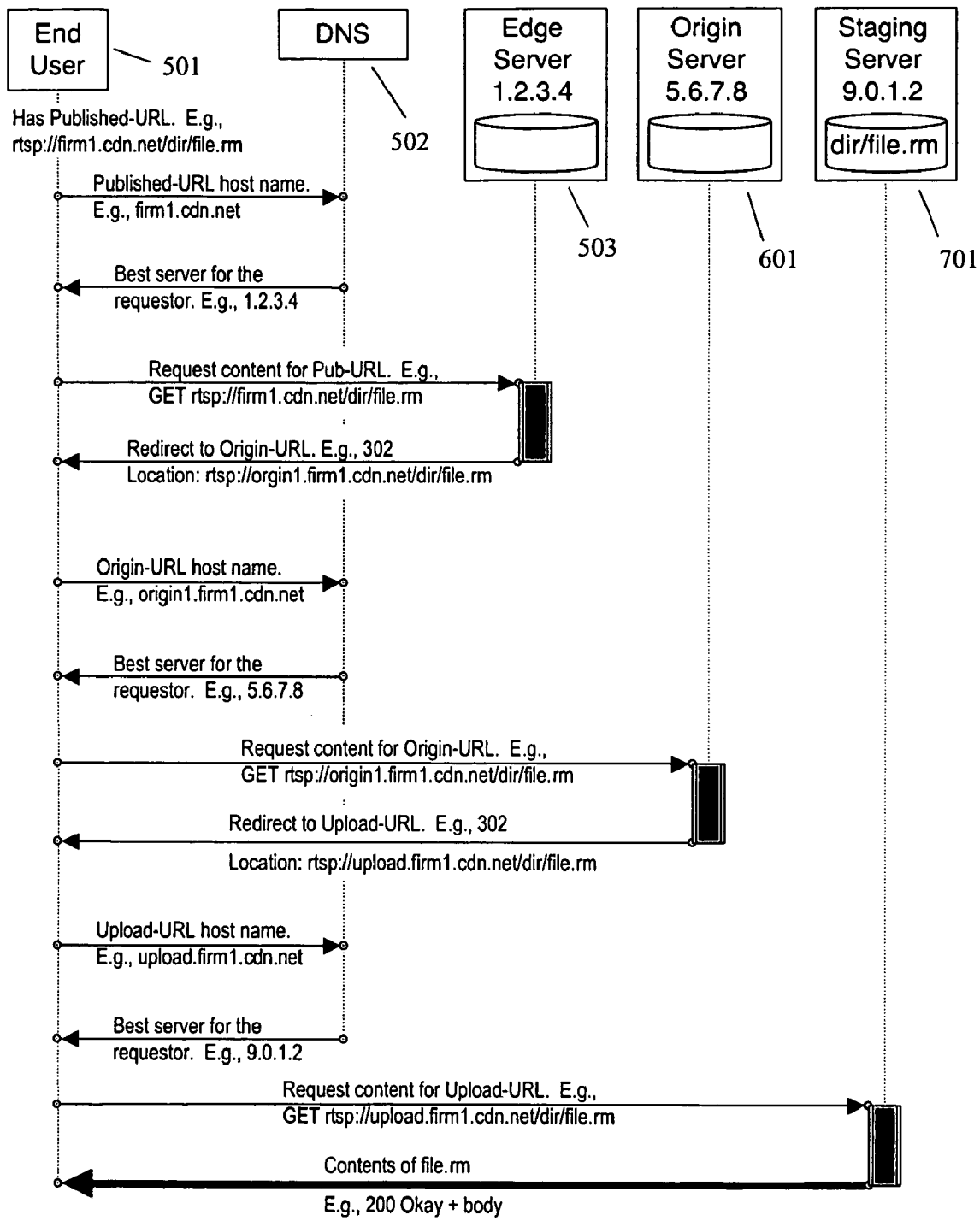
FIG. 7 illustrates a sequence diagram of a staging server delivering content to a user that has not been replicated across a group of edge servers according to an embodiment of the invention.
Figure 8:
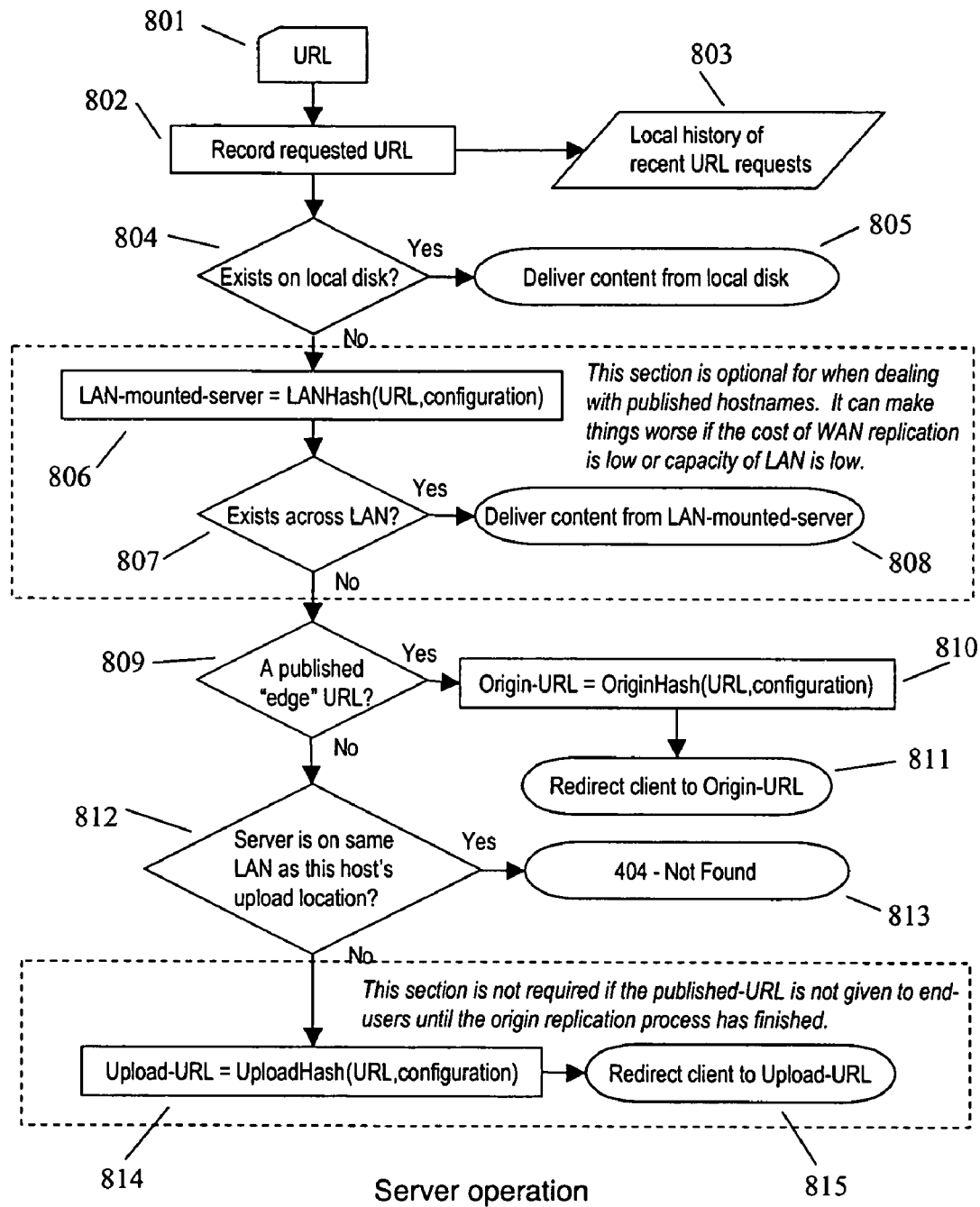
FIG. 8 illustrates a flow chart showing server operation according to an embodiment of the invention.

FIG. 8 illustrates the operation of servers in the system and encompasses the operations of FIGS. 5, 6, and 7. With respect to FIG. 5, the delivery of popular content from an edge server is shown. For popular objects requested by the end-user 501, the DNS server 502 finds the appropriate edge server to serve the requested content. The DNS server 502 directs the user 501 to the best edge server 503. The edge server 503 receives the URL 801. It records the URL 802 into a history of recent URL requests 803. The edge server 503 finds the popular content on its local storage device 804 and the edge server 503 responds to the user 501 with the content 805.

If the edge server 503 does not find the content on its local storage, it optionally searches the LAN-connected servers (if any exist) for the content 806, 807. If the content is on one of the LAN-connected servers, then the content is delivered from that server 808. The LAN search is efficient if the capacity of the LAN is high enough and the cost of WAN replication is high.

FIG. 6 continues illustrating the case where the edge server 503 does not find the requested content in its local storage and LAN-connected severs. The requested content then falls into the unpopular content category. The edge server 503 responds to the user 501 with a redirect to a new URL 809 that contains an origin hostname that includes a hash 810 that allows the intelligent DNS 502 to determine which origin servers should contain the object on its local storage device and also which servers also have LAN access to these origin copies. The DNS will reply with the Internet addresses of the best origin servers 811, favoring those origin servers with the content present on its local storage device 601. The origin server 601 will return the content to the user 501 if it has the content in its local storage device.

If the URL is not a published URL, i.e., it is a redirected URL, and the server 601 is on the same LAN as the customer's designated staging site 812, then the content is not available and the origin server 601 returns a not found to the user 501.

FIG. 7 illustrates the case when the published URL is made available to the user 501 before the origin servers have replicated the content. If the intelligent DNS 502 redirects the user 501 to an origin server 601 in a LAN group that has not yet received its replica of the content requested, the origin server 601 can repeat the redirection process 814, but this time with a hostname that the intelligent DNS 502 can use to determine the staging server 701 that the content was originally uploaded to and all the servers that can access it via a LAN. The intelligent DNS 502 redirects 815 the user 501 to the staging server 701. The staging server 701 sends the content to the user 501.

Figure 9:
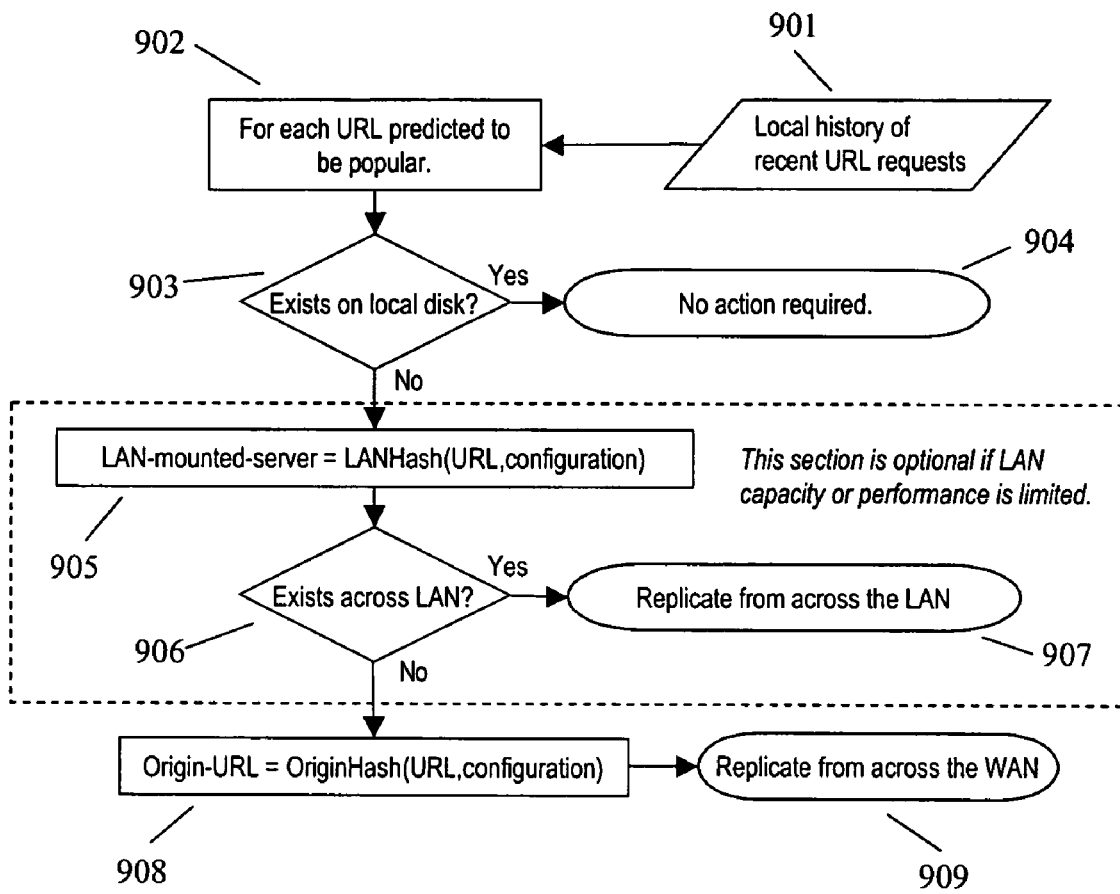
FIG. 9 illustrates a flow chart showing edge server selection of a source server for replicating content according to an embodiment of the invention.

FIG. 9 illustrates the operation of the edge servers when replication of popular content is required. The edge servers keep track of the popularity of content requested by users and initiate replication of content to its local storage device and re-replication to make the best use of its available storage.

The edge server periodically examines its local history of recent URL requests 901. It checks each URL 901 to see if the content exists on its local storage device 903. If the content is already on the local storage device, then no action is required for that content.

If the content is not on the local storage device, then the edge server checks the LAN-connected servers (if they exist) for the content 905, 906. If the content is on one of the LAN-connected servers, then the edge server replicates the content from that server 907. This is performed if there is sufficient bandwidth in the LAN to be more efficient than replicating across the WAN.

If the edge server decides to replicate the content from the WAN. It locates 908 the origin server that is known to store the content and performs the replication of the content from that origin server 909.

3.3 Replicating and De-Replicating Files

For content delivered to end-users by protocols that can transfer the exact contents of the object (e.g., HTTP), edge servers can replicate the object by requesting it using the same protocol as end users would. Edge servers can request the content from the best origin server, where best is be determined by the intelligent DNS system.

Faster replication may be achieved by requesting portions of the content from many servers at once. Again, the intelligent DNS system can be used to choose the top N origin servers from which to request portions of the content. These origin servers will typically be servers at different locations that have the requested content on local storage, but at times when some of those origin servers are heavily loaded or N is greater than the number of configured origin LAN groups, some origin servers will need to access the content over the LAN.

Some edge servers could also be included in the candidate list of servers for the top N servers for replicating. This can help in the later stages of content replication where the content has already been replicated to many edge servers.

These internally generated replication requests are not considered when determining whether an object is popular or not.

For all content that is only accessible to end-users by a protocol or format that can not be easily used to reconstruct original content in the format required by the delivery servers (e.g., MMS and Microsoft.wmv files, or RTSP and Real Networks SureStream files), an alternate access method needs to be provided, e.g., a parallel private HTTP service secured for internal use only.

Edge servers can de-replicate files with no need for external communication. They can do this using:

An estimation of what objects will be unpopular.

A local index of what files are currently replicated to the local storage device, e.g., the operating system's own file system index.

Note a buffer of free space should be available to prevent fragmentation and allow for the remaining delivery to existing connections.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
providing a plurality of edge servers;
wherein edge servers are servers that deliver content to end users;
wherein the edge servers serve a customer's most popular content to requesting users;
wherein a customer is allocated a certain amount of memory to store the customer's most popular content on each edge server in a set of edge servers, the amount of memory based on a fee paid by the customer;
wherein at least one specific set of edge servers among a plurality of sets of edge servers serve a particular customer's most popular content to requesting users;
tracking popularity of a customer's content on an edge server based on number of requests for the customer's content;
creating an ordered list of a customer's most popular content files using number of requests tracked for a particular file; and
evaluating the ordered list for newly popular content files not stored in the edge server's local storage that have become more popular than content files stored in the edge server's local storage.

2. The method of claim 1, further comprising:
wherein a plurality of origin servers store all of a customer's available content; and replicating newly popular content onto the edge server's local storage from content from the origin servers.

3. The method of claim 2, further comprising replacing a lower popularity content file in local storage with a replicated content file.

4. The method of claim 2:
wherein the customer schedules content to be uploaded from a customer server to a staging server; and
wherein the staging server uploads received content to appropriate origin servers.

5. The method of claim 1, wherein the plurality of edge servers are partitioned into a plurality of sets of edge servers based on geographic regions.

6. The method of claim 5, wherein the plurality of edge servers are further partitioned into a global set of edge servers.

7. The method of claim 1, wherein the plurality of edge servers are dynamically partitioned into a plurality of sets of edge servers based on using factors that include any of: lower current cost, higher performance, and time-based availability.

8. The method of claim 1, further comprising:
receiving a user's request for customer content at an edge server;
sending the requested content to the user if the requested content is stored on the edge server's local storage; and
redirecting the user to an origin server that is likely to have the content stored locally if the edge server does not have the requested content.

9. The method of claim 8, wherein the redirecting step is located on a server that selects the best origin server by favoring origin servers that should be able to access the content on their local storage device rather than across a network.

10. The method of claim 8, further comprising:
receiving the user's redirected request on the origin server;
sending the requested content to the user if the requested content is stored on the origin server's local storage; and
redirecting the user to the customer's staging server if the origin server does not have the requested content.

11. The method of claim 10, wherein the redirecting step is located on a server that selects the best staging server by favoring staging servers that should be able to access the requested content on their local storage device rather than across a network.

12. An apparatus, comprising:
a plurality of edge servers;
wherein edge servers are servers that deliver content to end users;
wherein the edge servers serve a customer's most popular content to requesting users;
wherein a customer is allocated a certain amount of memory to store the customer's most popular content on each edge server in a set of edge servers, the amount of memory based on a fee paid by the customer;
wherein at least one specific set of edge servers among a plurality of sets of edge servers serve a particular customer's most popular content to requesting users;
tracking means on an edge server for tracking popularity of a customer's content based on number of requests for the customer's content;
wherein the tracking means creates an ordered list of a customer's most popular content files using the number of requests tracked for a particular file; and
a module for evaluating the ordered list for newly popular content files not stored in the edge server's local storage that have become more popular than content files stored in the edge server's local storage.

13. The apparatus of claim 12, further comprising:
wherein a plurality of origin servers store all of a customer's available content; and
replicating means on the edge server for replicating newly popular content onto the edge server's local storage from content from the origin servers.

14. The apparatus of claim 13, further comprising a module for replacing a lower popularity content file in local storage with a replicated content file.

15. The apparatus of claim 13:
wherein the customer schedules content to be uploaded from a customer server to a staging server; and
wherein the staging server uploads received content to appropriate origin servers.

16. The apparatus of claim 12, wherein the plurality of edge servers are partitioned into a plurality of sets of edge servers based on geographic regions.

17. The apparatus of claim 16, wherein the plurality of edge servers are further partitioned into a global set of edge servers.

18. The apparatus of claim 12, wherein the plurality of edge servers are dynamically partitioned into a plurality of sets of edge servers based on using factors that include any of: lower current cost, higher performance, and time-based availability.

19. The apparatus of claim 12, further comprising:
receiving means on an edge server for receiving a user's request for customer content;
means for sending the requested content to the user if the requested content is stored on the edge server's local storage; and
means for redirecting the user to an origin server that is likely to have the content stored locally if the edge server does not have the requested content.

20. The apparatus of claim 19, wherein the redirecting means is located on a server that selects the best origin server by favoring origin servers that should be able to access the content on their local storage device rather than across a network.

21. The apparatus of claim 19, further comprising:
means for receiving the user's redirected request on the origin server;
means for sending the requested content to the user if the requested content is stored on the origin server's local storage; and
means for redirecting the user to the customer's staging server if the origin server does not have the requested content.

22. The apparatus of claim 21, wherein the redirecting means is located on a server that selects the best staging server by favoring staging servers that should be able to access the requested content on their local storage device rather than across a network.

wherein the plurality of edge servers are further partitioned into a global set of edge servers, and wherein the charging step charges the customer a higher fee for a memory allocation in the global set of edge servers.

23. The method of claim 1, wherein the plurality of sets of edge servers are dynamically determined using factors that include any of: lower current cost, higher performance, and time-based availability.

24. The apparatus of claim 12, wherein the plurality of sets of edge servers are dynamically determined using factors that include any of: lower current cost, higher performance, and time-based availability.

* * * * *